US012377667B2

(12) United States Patent
Massara

(10) Patent No.: US 12,377,667 B2
(45) Date of Patent: Aug. 5, 2025

(54) INK JET DIGITAL PRINTING MACHINE

(71) Applicant: QUANTIX DIGITAL S.r.l., Vigevano (IT)

(72) Inventor: Matteo Massara, Vigevano (IT)

(73) Assignee: QUANTIX DIGITAL S.r.l., Vigevano (IT)

( * ) Notice: Subject to any disclaimer, the term of this patent is extended or adjusted under 35 U.S.C. 154(b) by 148 days.

(21) Appl. No.: 18/559,124

(22) PCT Filed: May 5, 2022

(86) PCT No.: PCT/EP2022/062131
§ 371 (c)(1),
(2) Date: Nov. 6, 2023

(87) PCT Pub. No.: WO2022/234006
PCT Pub. Date: Nov. 10, 2022

(65) Prior Publication Data

US 2024/0239114 A1 Jul. 18, 2024

(30) Foreign Application Priority Data

May 7, 2021 (IT) ........................ 102021000011804

(51) Int. Cl.

| | |
|---|---|
| ***B41J 11/00*** | (2006.01) |
| ***B41J 3/407*** | (2006.01) |
| ***B41J 25/308*** | (2006.01) |
| ***B41J 25/316*** | (2006.01) |

(52) U.S. Cl.
CPC ........... *B41J 11/007* (2013.01); *B41J 3/4073* (2013.01); *B41J 3/40733* (2020.08); *B41J 25/308* (2013.01); *B41J 25/3082* (2013.01); *B41J 25/316* (2013.01); *B41J 2203/01* (2020.08)

(58) Field of Classification Search
CPC .... B41J 11/007; B41J 3/4073; B41J 3/40733; B41J 25/308; B41J 25/3082; B41J 25/316; B41J 2203/01
See application file for complete search history.

(56) References Cited

U.S. PATENT DOCUMENTS 6,360,656 B2 * 3/2002 Kubo ..................... B41J 25/003 400/70
2005/0087083 A1 * 4/2005 Dumenil ............. B41F 15/0863 101/115
2015/0059601 A1 * 3/2015 Domeier .............. B41J 3/40733 101/486
2016/0159087 A1 * 6/2016 Sonnauer ............... B41J 3/4073 347/14

(Continued)

OTHER PUBLICATIONS

International Search Report and Written Opinion dated Aug. 25, 2022, from corresponding International Application No. PCT/EP2022/062131.

*Primary Examiner* — Henok D Legesse
(74) *Attorney, Agent, or Firm* — Troutman Pepper Locke LLP

(57) ABSTRACT

An ink jet digital printing machine configured to detect an eccentricity profile of the containers to be printed and to move the printing heads with an hourly law that is univocally determined by the eccentricity profile so as to maintain the distance of the printing heads from the containers to be printed constant during the rotation of the containers on themselves.

10 Claims, 9 Drawing Sheets

(56) References Cited

U.S. PATENT DOCUMENTS

| | | | | |
|---|---|---|---|---|
| 2017/0066232 | A1* | 3/2017 | Litvinov | B41J 3/40731 |
| 2018/0236780 | A1* | 8/2018 | Peutl | B41J 11/0015 |
| 2019/0193422 | A1* | 6/2019 | Ferrari | B41J 2/16517 |

* cited by examiner

INK JET DIGITAL PRINTING MACHINE

CROSS-REFERENCE TO RELATED APPLICATIONS

The present application is a U.S. National Phase Application under 35 U.S.C. § 371 of International PCT/EP2022/062131 filed May 5, 2022, which claims priority of Italian Patent Application No. 102021000011804 filed May 7, 2021. The entire contents of which are hereby incorporated by reference.

FIELD OF THE INVENTION

The present invention relates to an ink jet digital printing machine for printing on containers having a longitudinal axis.

BACKGROUND

In some solutions present on the market for printing on cylindrical containers, a rotary table is included which is provided with support spindles of the cylindrical containers.

The rotary table rotates to position the spindles at the next printing stations in each of which special printing heads apply different color ink between one printing station and the other.

When stopped at a printing station, the spindle rotates on itself to expose the entire side surface of the cylindrical containers to the printing heads.

One of the main problems to be faced in this type of printing machine is how to ensure the same printing quality as the format of the cylindrical containers varies.

Such a problem is further complicated by the fact that in actual production, there are some generators of uncertainty.

Firstly, the diameter tolerance of the containers to be printed, determined by the specific production process. This tolerance is rather low for metal products, however for plastic products it is relevant for the digital printing process.

Secondly, the clearance between the spindle and the cylindrical container, necessary for handling the cylindrical container itself in the machine. This tolerance is common to plastic and metal containers. The above technology has solved this problem for metal containers, by means of a gripping system of the piece with expansion gripper, as shown in DE102005052506B4. While ensuring the equidistance of the surface to be printed from the nozzles of the printing heads during the rotation itself of the cylindrical container posed on the spindle, the solution presents the critical issue of possible damage to the piece itself, if the material of the container is soft, for example annealed aluminium, or is particularly delicate in its internal painting.

SUMMARY

Therefore, the technical task of the present invention is to provide an ink jet digital printing machine for printing on containers having a longitudinal axis which allows to obviate the above-described technical drawbacks of the prior art.

As part of this technical task, an object of the invention is to create an ink jet digital printing machine for printing on containers having a longitudinal axis which is versatile and adaptable to print on different formats always with the same printing quality, regardless of the constructive tolerances of the containers and the tolerances for coupling the containers to the spindles.

Another object of the invention is to create an ink jet digital printing machine for printing on containers having a longitudinal axis, where the printing can be performed with high quality without damaging the containers.

Another object of the invention is to provide an ink jet digital printing machine for printing on containers, also not cylindrical in shape, having a longitudinal axis.

Another object of the invention is to provide an ink jet digital printing machine for printing on containers having a longitudinal axis which combines printing quality and production capacity.

The technical task, as well as these and other objects, according to the present invention are achieved by providing an ink jet digital printing machine for printing on at least one container with a longitudinal axis, comprising a conveying table for conveying said at least one container and at least one printing station provided with at least one printing head, wherein said table has a rotation axis and supports at least one support spindle on which said container is lockable, wherein said at least one spindle has an axis oriented radially with respect to said rotation axis of said conveying table, wherein said conveying table is configured to convey and station said at least one spindle at said at least one printing station wherein said at least one spindle can be activated in rotation on its axis, wherein said at least one spindle stationed at said at least one printing station has its axis parallel to the longitudinal axis of said at least one printing head, characterized in that it comprises movement means for moving said at least one printing head, a detection station for detecting an eccentricity profile of said at least one container including distance sensor means of said at least one container locked on said at least one spindle rotating on itself, and an actuation controller for actuating said movement means configured to drive said movement means, during the rotation of said at least one spindle on itself at said at least one printing station, with an hourly law that is univocally determined by said detected eccentricity profile so as to maintain the distance of said at least one printing head from said at least one container constant.

By virtue of the invention, the distance between the emitters of the ink drops, i.e., the nozzles of the printing heads, and the substrate to be decorated remains constant to always ensure the same printing quality.

In fact, since the drops are emitted at a constant speed, the time for reaching the substrate is the same for all the drops emitted.

This advantageously allows to maintain the register between the different colors and avoid the distortion of the images to be printed.

According to the invention, the eccentricity of the container is compensated under the printing process, so as to ensure the application precision of the drops and relative high image quality, without creating risks of deterioration of the painting quality and even less of the geometry itself of the piece, thus leaving the piece free to position itself on the support spindle.

According to the invention, the movement means includes a servo-assisted motorization for a two-directional linear movement, for example vertically upwards and downwards, of the printing head or also of a group of printing heads present in the printing station.

Advantageously, the piece can settle on the spindle, without undergoing any mechanical actions or forcing.

The piece can be retained on the spindle by a pneumatic action (suction cup with vacuum) or with a magnetic action, in the case of ferromagnetic containers.

The distance sensor means detects, during the rotation of the piece, its eccentricity profile through the measurement of the mutual distance, acquiring a series of points along the outer peripheral profile of the piece.

The electronic controller acquires the eccentricity profile and constructs a corresponding eccentricity curve of the piece which it sends to the motorization driver which moves the printing head or the group of printing heads of the printing station.

The motorization, based on the eccentricity curve, then generates the movement so that the distance between the printing head or group of printing heads and the container is constant during the rotation on itself of the container in the printing station.

The detection of the eccentricity profile of the container is performed at a station upstream of the printing station.

If, as is generally the case, the printing machine comprises a series of printing stations aligned along the trajectory of the spindles supported by the rotary table, the printing head or the group of printing heads of the subsequent printing stations are moved in sequence according to the same hourly law during the stationing of the container thereat.

In fact, once locked by the spindle, the container retains its eccentricity position and the angular position for its entire duration inside the printing machine.

The synchronous rotation inside the printing machine allows to transfer the hourly motion law to the next printing stations for the precise application of the next ink colors.

Preferably the distance sensor means detects the eccentricity profile at at least two axial dimensions of the container for a better and more precise reconstruction of the real position of the piece. This allows for greater control if the piece is positioned askew with respect to the spindle axis.

The invention extends the application for the digital printing of non-cylindrical containers, but with an axis of symmetry along the generatrix (for example, tubes or oval bottles).

In this case, by means of a special printing algorithm, the electronic controller can stretch the image to adapt it to the different tangential speeds with which the container is presented in front of the printing head or the group of printing heads. Other features of the present invention are further defined in the following claims.

BRIEF DESCRIPTION OF THE DRAWINGS

Further features and advantages of the invention will become more apparent from the description of a preferred, but not exclusive, embodiment of the apparatus of the ink jet digital printing machine for printing on substrates having a longitudinal axis according to the invention, which is illustrated by way of non-limiting example in the attached drawings, of which.

DETAILED-DESCRIPTION

Figure 1:
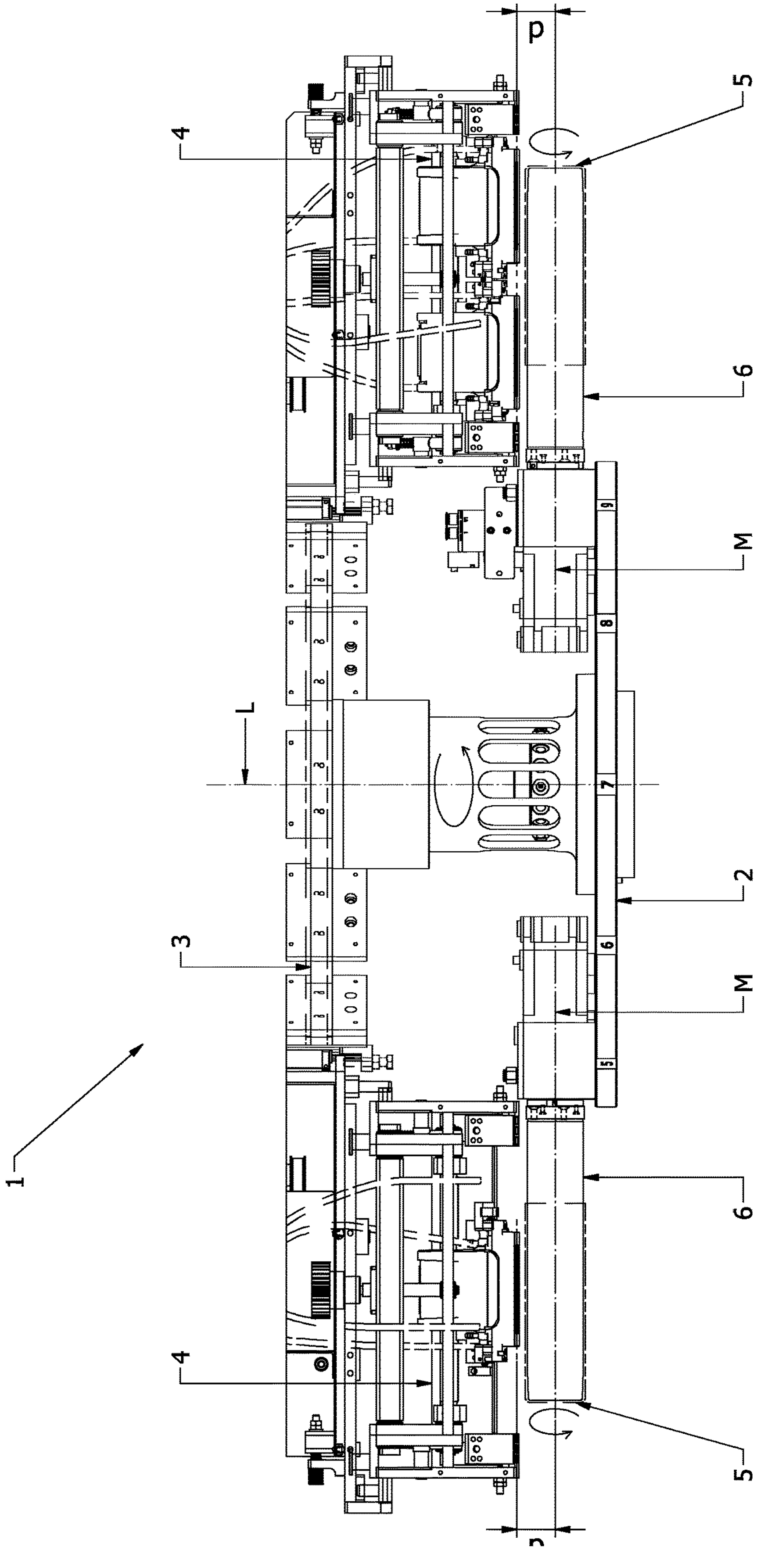
FIG. 1 shows a schematic side elevation view of the printing machine where for clarity only two printing stations are shown.
Figure 2:
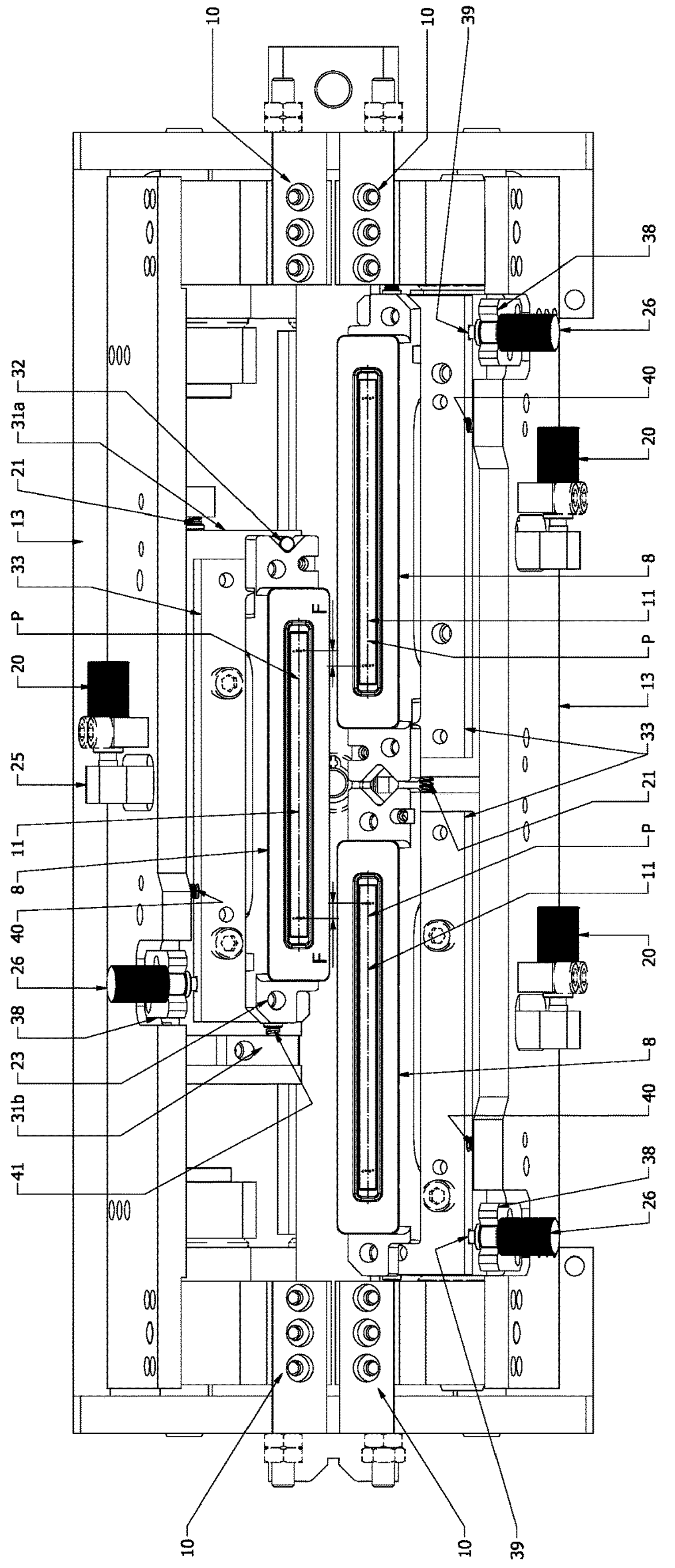
FIG. 2 shows a plan view from below of a printing station.
Figure 3:
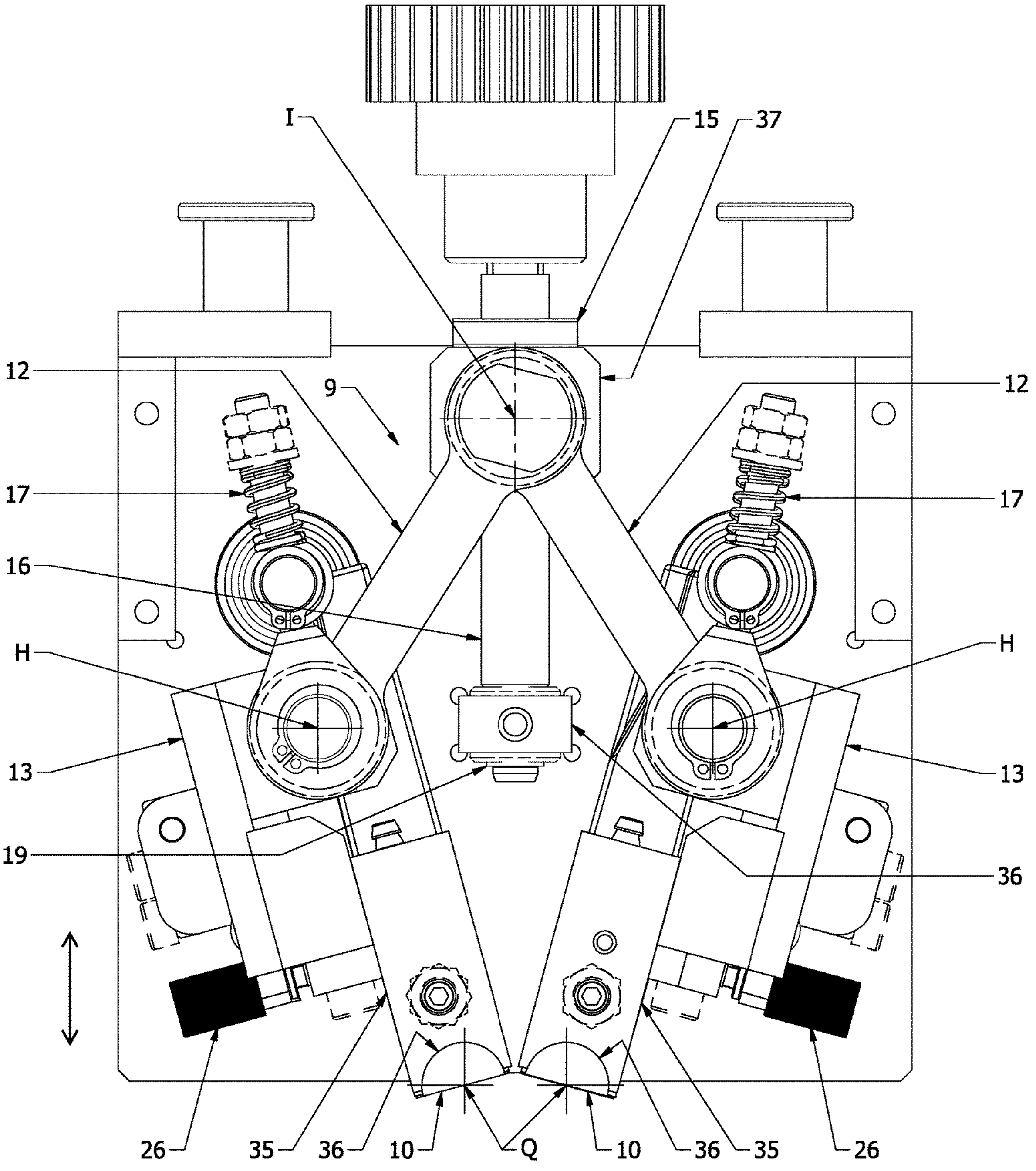
FIG. 3 shows a view of a printing station in the radial direction with respect to the rotation axis of the table.
Figure 4:
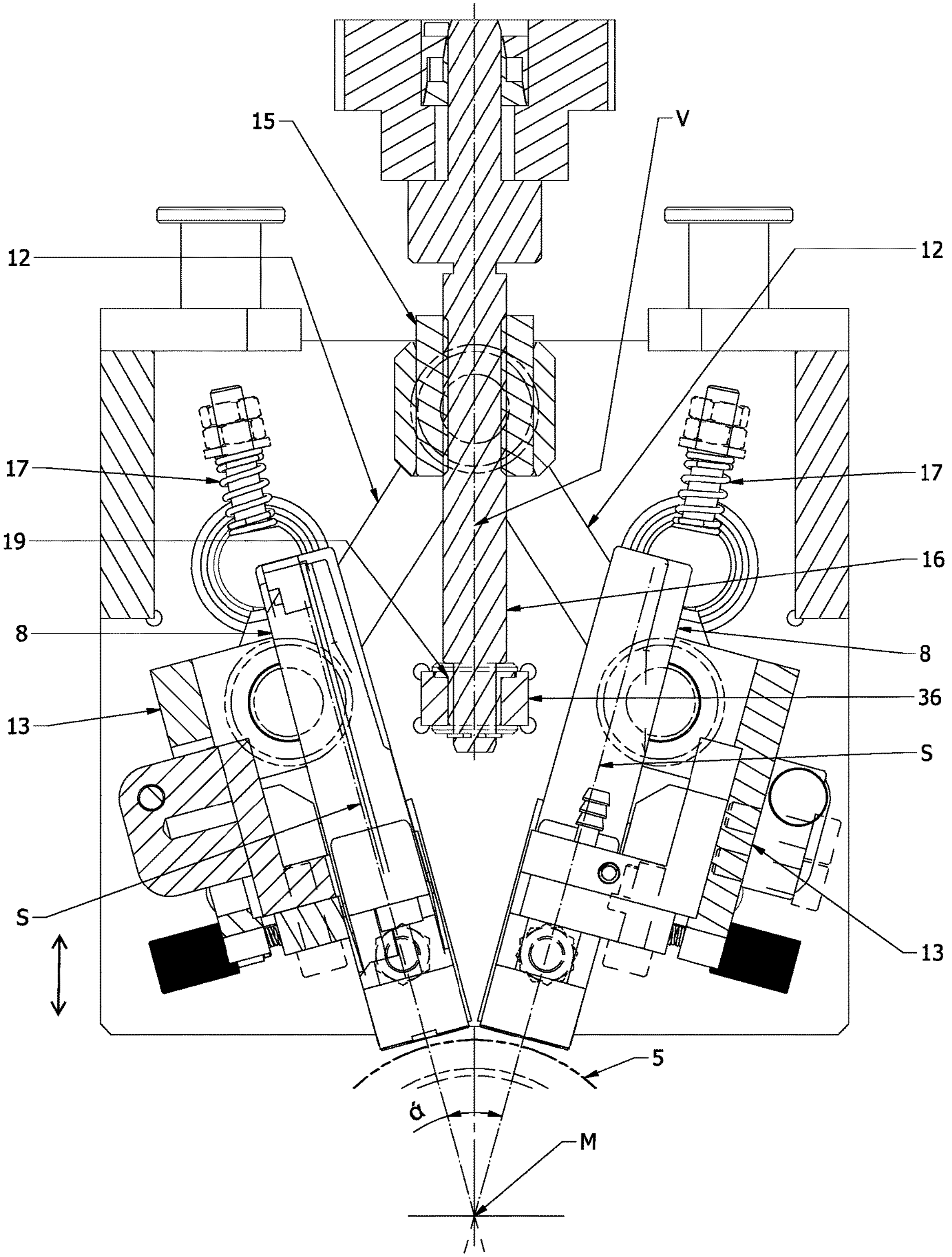
FIG. 4 shows the same view as FIG. 3 but in vertical section, where the axial generatrices of the printing substrate have been added in a schematic manner.
Figure 5:
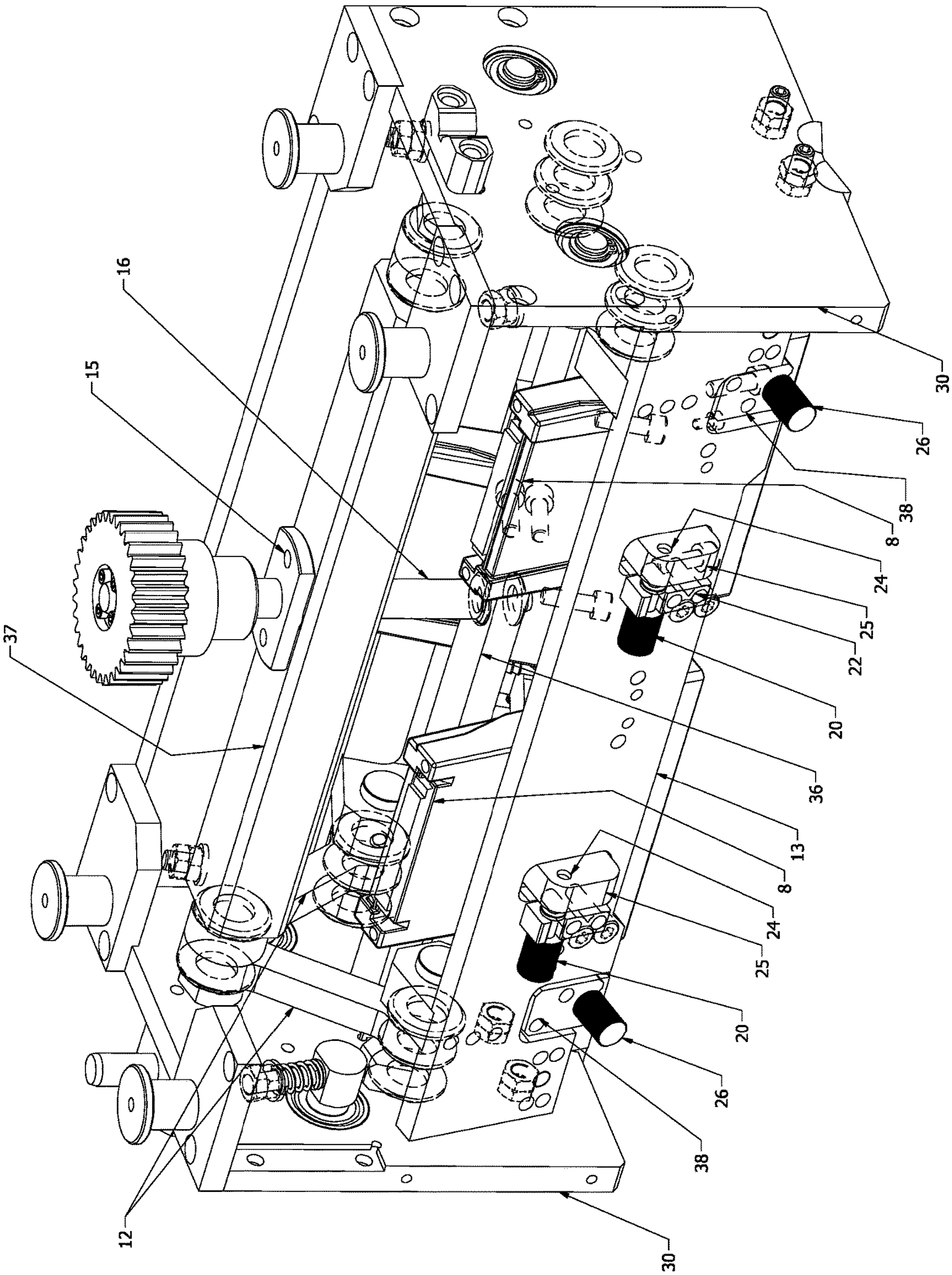
FIG. 5 shows an axonometric view of the printing station.
Figure 6:
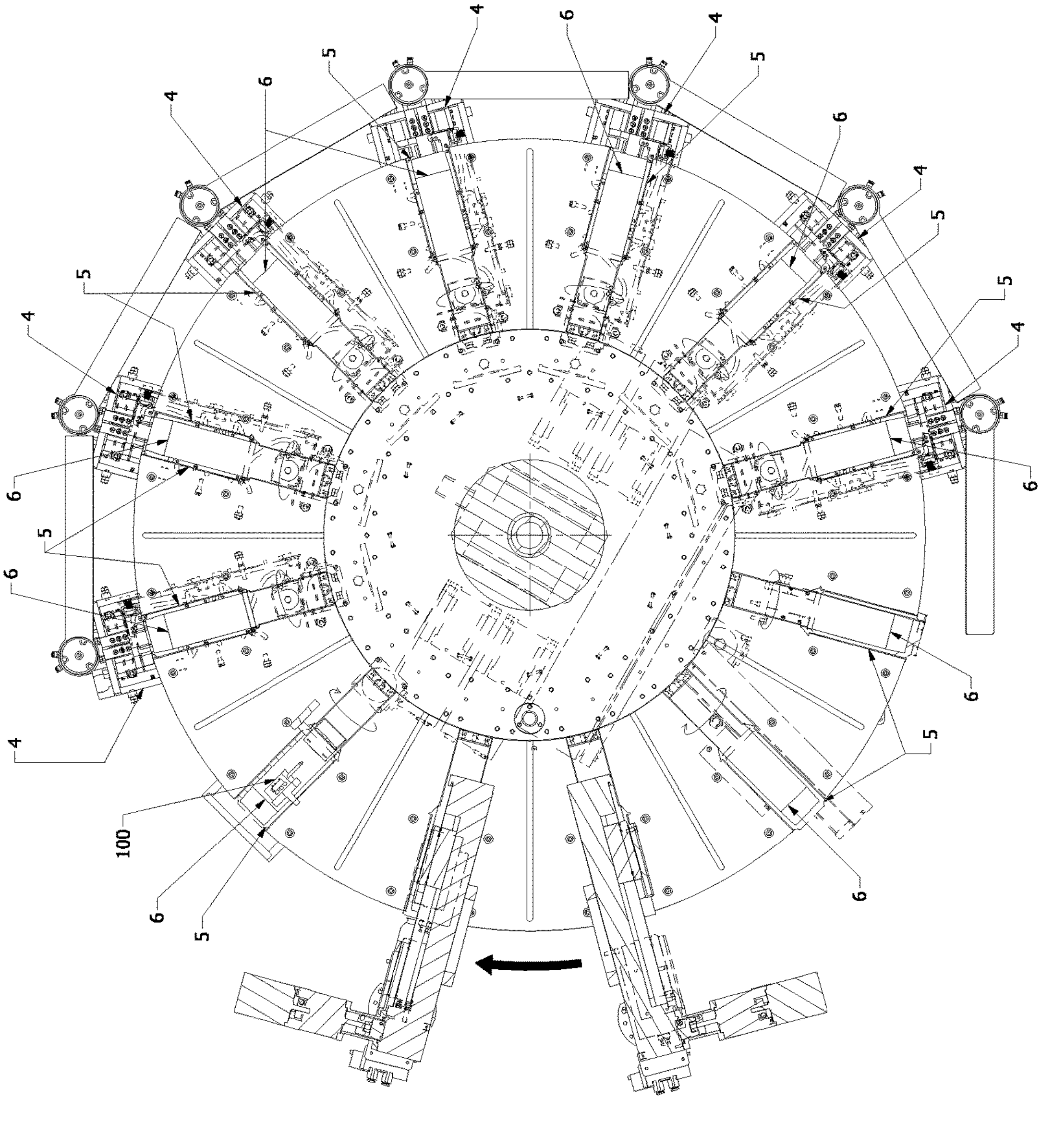
FIG. 6 shows a plan view from below of the printing machine.
Figure 7:
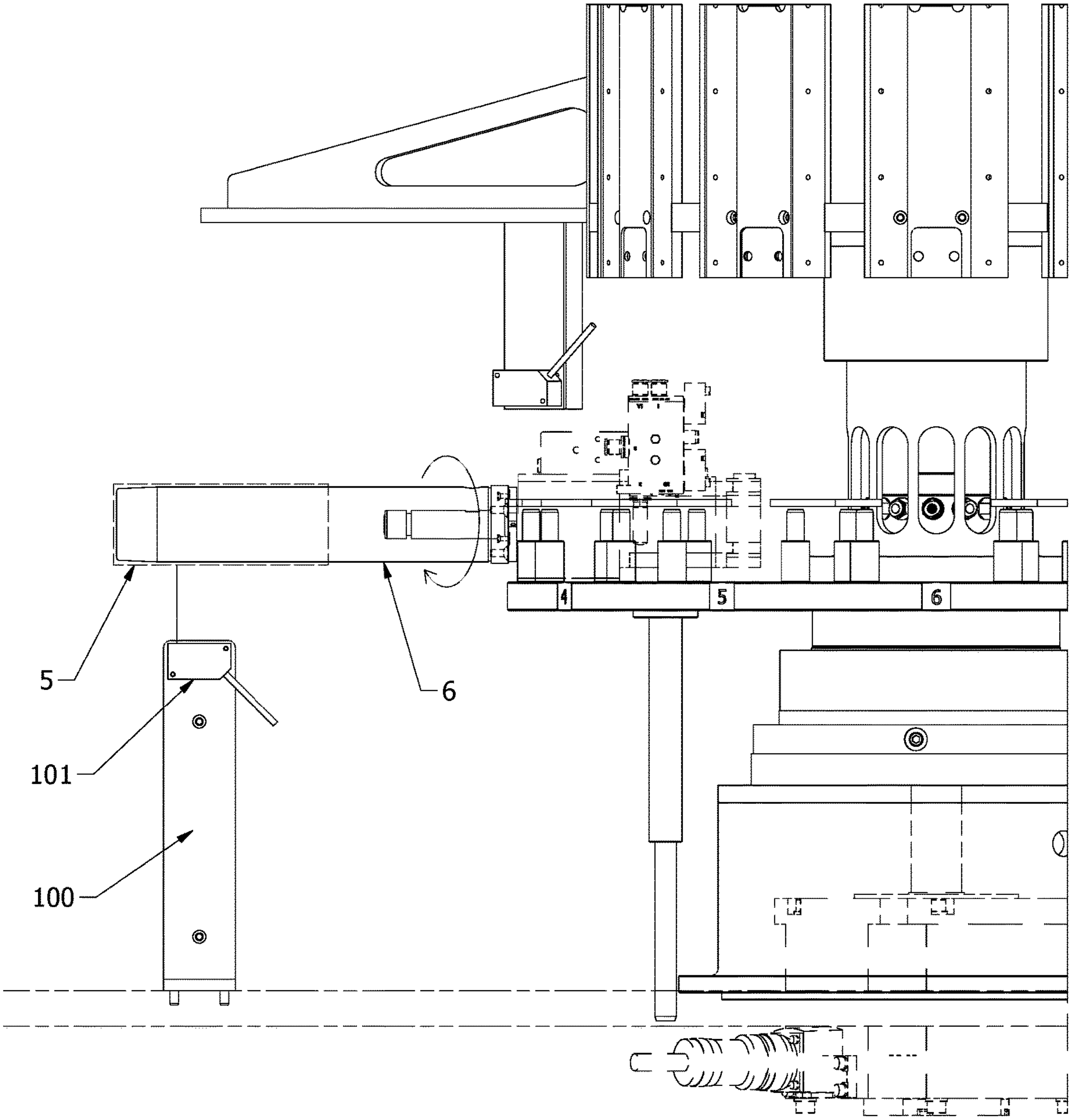
FIG. 7 shows a side elevation view of the eccentricity profile detection station.
Figure 8:
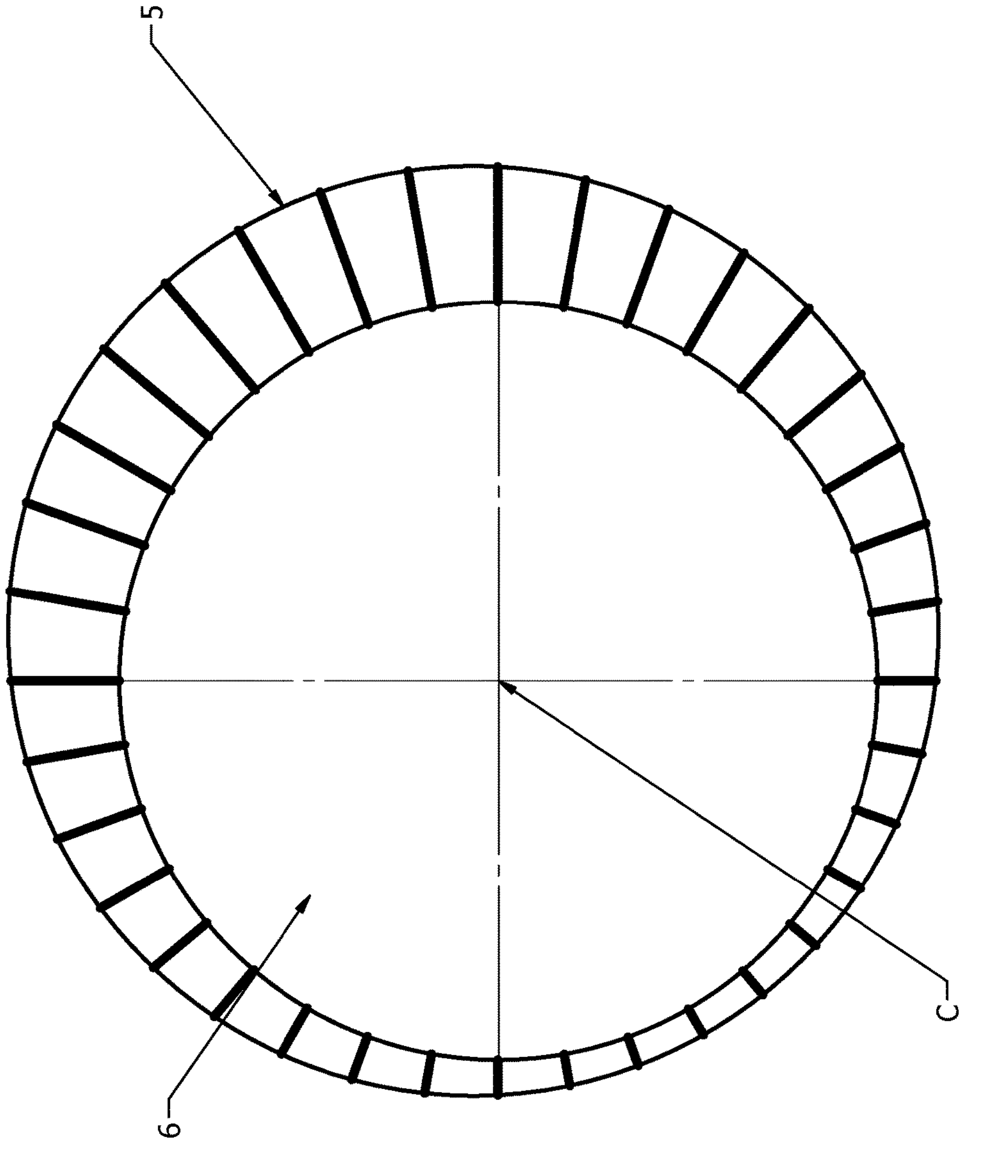
FIG. 8 shows an eccentricity profile of a container locked on the spindle.
Figure 9:
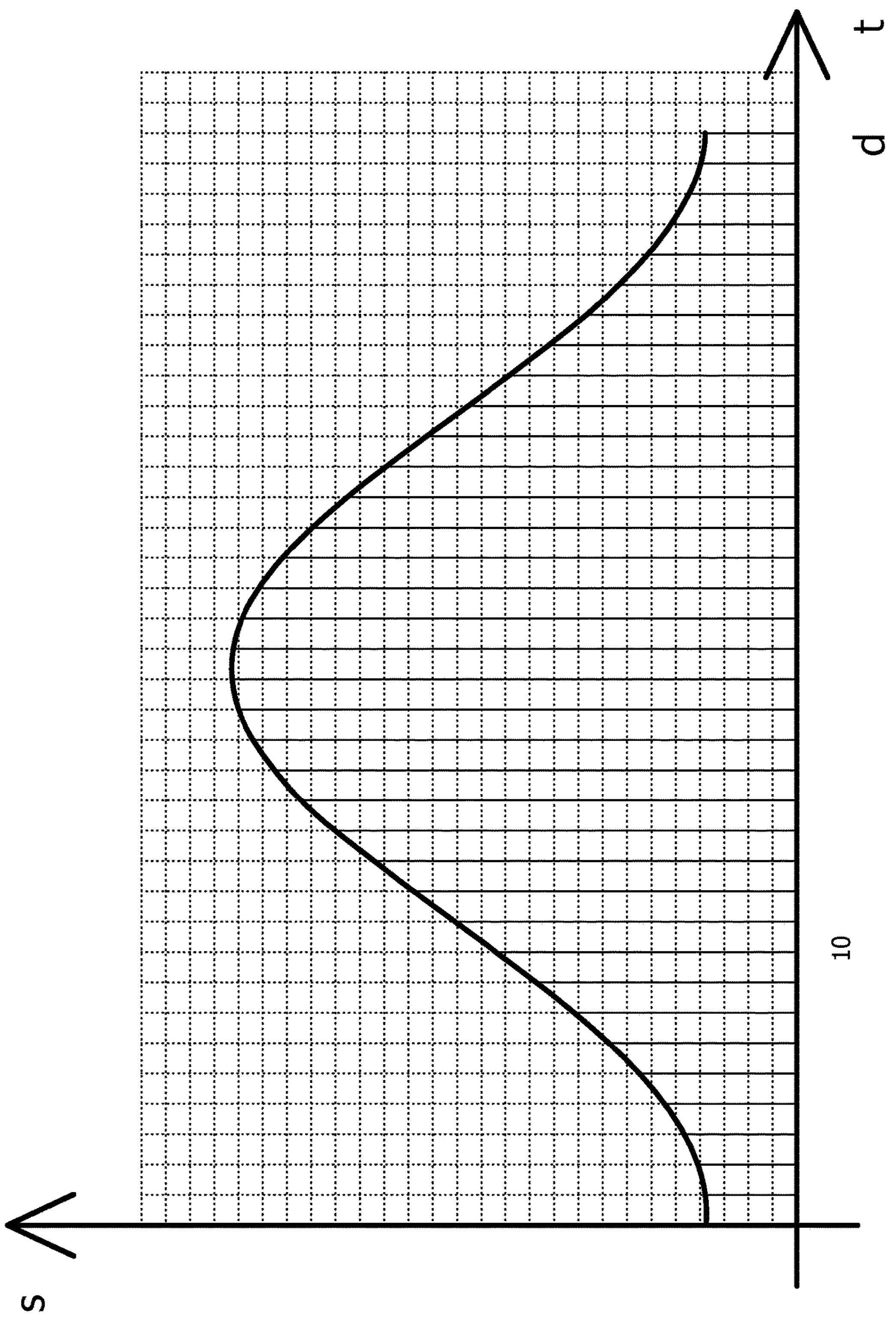
FIG. 9 shows the hourly motion law of the printing head or the group of printing heads of the printing station.

With reference to the figures mentioned, an ink jet digital printing machine 1 for printing on containers 5 having a longitudinal axis C is shown.

The substrates 5 can be intended for various purposes, e.g., food cans or deodorant spray cans, detergents, etc.

The machine 1 comprises a printing unit 3 comprising one or preferably more printing stations 4 extending longitudinally and a rotary conveyor table 2 for sequentially conveying containers 5 through the printing stations 4.

The table 2 has a rotation axis L and supports one or more spindles 6 for supporting the containers 5.

The rotation axis L of the table 2 is preferably vertical.

The spindles 6 are positioned at a defined angular spacing pitch, particularly constant, about the rotation axis L of the table 2.

Each spindle 6 has an axis M oriented radially with respect to the rotation axis L of the table 2 and can be activated in rotation on its axis M by a special motorization not shown.

Each spindle 6 has an internal suction to lock the container 5 on the spindle 6.

The container 5 can also be locked on the spindle 6 by a special magnetic locking element, in the case of ferromagnetic containers 5.

The printing unit 3 has printing stations 4 positioned along the circular trajectory of the spindles 6.

In the illustrated case in which the table 2 has a vertical rotation axis L, the printing stations 4 are positioned above the rotary table 2.

The printing stations 4 are positioned at a defined angular spacing pitch about the rotation axis L of the table 2, in particular equal to or a multiple of the angular spacing pitch of the spindles 6.

Each printing station 4 is provided with one or preferably a group of printing heads 8 having a parallel longitudinal axis P.

The table 2 can be activated in step-by-step rotation by a special motorization not shown for the sequential transfer and stopping of the spindles 6 with the containers 5 at the printing heads 8 of the printing stations 4.

Each spindle 6 has its axis M parallel to the longitudinal axis P of the printing heads 8 of the printing station 4 at which it is stopped.

The main lying plane S, referring to the substantially parallelepiped-shaped printing head 8 illustrated, corresponds to the center plane parallel to the two lateral longitudinal surfaces.

In a printing head 8 of this shape, the lower longitudinal surface is equipped with one or more parallel longitudinal rows of firing nozzles.

Each spindle 6 has an axis M equidistant from the printing heads 8 of the printing station 4 at which it is stopped.

Advantageously, each printing station 4 includes special movement means for collectively moving all the printing heads 8.

In particular, the movement means includes a servo-assisted motorization for a two-directional linear movement of the heads 8 in a direction parallel to the rotation axis L of the table 2.

Advantageously, moreover, the printing machine 1 includes a station 100 for detecting the eccentricity profile of the containers 5.

The detection station 100 includes distance sensor means of the containers locked on the respective spindles 6 rotating on themselves.

The detection station 100 further includes an actuation controller for actuating the movement means of each printing station 4.

The controller is configured to activate the movement means, during the rotation of the spindle 6 on itself at a printing station 4, with an hourly law s=s(t) univocally determined by the detected eccentricity profile.

The hourly law s=s(t) is defined starting from the detected eccentricity profile so as to maintain the distance of the printing heads 8 from the container 5 at each printing station 4 during the printing process constant.

The sensor means 101 comprises one or more non-contact distance sensors, for example optical sensors.

The distance sensors 101 are mounted in a fixed position in the detection station 100 and are oriented orthogonally to the axis M of the spindle 6.

In a 360° rotation of the spindle 6 on itself, the sensors 101 acquire an eccentricity profile of the container 5 locked on the spindle 6.

Preferably, for a more accurate reconstruction of the eccentricity of the container 5, at least two optical sensors spaced along the axis of the spindle 6 are included.

The sensor means detects, during the rotation of the container 5, its eccentricity through the measurement of the mutual distance, acquiring a series of points along the outer peripheral profile of the container 5.

In practice, the electronic controller acquires the distance measurements and constructs an eccentricity curve of the piece with which it elaborates the hourly law s=s(t). Such a curve is sent to the motorization driver which moves the printing heads 8.

The motorization generates the movement according to the hourly law s=s(t) so that the distance between the printing heads 8 and the container 5 is constant during the rotation on itself of the container 5 at each printing station 4.

The detection of the eccentricity profile of the container 5 is performed at a station upstream of the printing stations 4.

The printing heads 8 of the subsequent printing stations are moved in sequence according to the same hourly law during the stopping of the same container 5 thereat.

In fact, once the container 5 is locked by the spindle 6, it retains its eccentricity position and the angular position for its entire duration inside the printing machine 1.

In the case of a container with a significantly eccentric profile, by means of a special printing algorithm, the electronic controller can stretch the image to be printed to adapt it to the different tangential speeds with which the container 5 is presented in front of the printing heads 8.

The machine 1 includes initial setting means for setting the initial distance d between the axis M of the spindle 6 and the printing heads 8 of the printing stations 4 and of the orientation of the main lying planes S of the printing heads 8.

The initial setting depends on the format of the containers 5 to be printed.

With the initial setting, the printing heads 8 are inclined so that the axis M of the spindle 6 stopped at the printing station 4 belongs to the centre plane S of the printing heads 8.

The longitudinal dimension of the printing station 4 must be such that it fits the axial length of the cylindrical printing substrates 5.

For this reason, although the solution shown merely by way of example includes three printing heads 8 per printing station 4, the number of printing heads 8 per printing station 4 can vary.

If the printing stations 4 envisage multiple printing heads 8, these must have a section F of overlap in the direction of their longitudinal axis P.

In order to ensure the partial overlap and at the same time the requested inclination of their main lying plane S, the adjacent printing heads 8 have an offset angle a. of their main lying plane S with respect to the axis M of the spindle 6.

Thus, two rows of printing heads 8 are delineated, where the printing heads 8 of each row share the main lying plane S.

The printing station 4 has a frame 30, 36 for supporting the two rows of printing heads 8. Each row of printing heads 8 is supported by a corresponding support structure 13, 23, 31.

Each support structure 13, 23, 31 comprises a longitudinal plate 13 and, for each printing head 8, an angular support 31*a*, 31*b* in turn supporting a cradle 23 for housing the printing head 8.

Each angular support 31*a*, 31*b* is independently supported by the longitudinal plate 13 in a linearly adjustable position along the longitudinal plate 13 itself.

Each angular support 31*a*, 31*b* in turn supports the cradle 23, and the printing head 8 fixed therein, in an angularly adjustable position about a pin 32. Each angular support 31*a*, 31*b* has a base 31*a* and a shoulder 31*b*.

More precisely, the cradle 23 is fixed to a base 33 resting against the base 31*a* of the angular support 31*a*, 31*b*.

The means for setting the orientation of the printing heads 8 comprises a toggle system 9.

The toggle system 9 can be activated to impose a coordinated rotation of the two rows of printing heads 8 about a respective pivot 10.

For each row of printing heads 8, the corresponding pivot 10 is positioned at the lower end 11 of the printing heads 8 and defines a rotation axis Q parallel to the axis M of the spindle 6.

On the pivots 10, consisting of pins with a crescent-shaped cross-section, end blocks 36 of the longitudinal plates 13 are engaged.

In particular, the end blocks 36 have special engagement seats 36 conjugated to the pivots 10 on their peripheral edge.

The toggle system 9 has symmetrical connecting rods 12 each of which has its lower end hinged to the longitudinal plate 13 of a corresponding support structure 13, 23, 31*a*, 31*b*.

The upper end of each connecting rod 12 is instead operatively connected to a screw nut 15 engaged so as to slide along a screw 16 having a vertical axis V which intercepts the axis M of the spindle 6.

More precisely, a longitudinal bar 37, which has hinges to the connecting rods 12 at the opposite ends, is centrally fixed to the screw nut 15.

The lower H and upper I hinge axes of the connecting rods 12 are in turn parallel to the axis M of the spindle 6.

The screw 16 is supported in a special housing 19 fixed to a longitudinal bar 36 of the frame 30, 36.

In practice, the screw 16 can rotate on itself without translating in order to drag the screw nut 15 upwards and downwards and thus activate the toggle 9.

Elastic pushing means is provided to maintain the rotation of the two rows of printing heads 8 around their respective pivots 10 when the toggle 9 is activated.

The elastic pushing means comprises symmetrical springs 17 configured and arranged to exert a thrust in an oblique downwards direction at the lower hinges of the connecting rods 12.

Each printing station 4 further comprises a fine adjustment means for adjusting the mutual position of the printing heads 8.

The fine adjustment means comprises the first fine adjustment means of the section of overlap F between the printing heads 8.

The first fine adjustment means comprises, for each printing head 8, a micrometric screw 20 counteracted by a spring 21 for eliminating the clearance of the thread of the micrometric screw 20.

The micrometric screw 20 is supported in a housing 22 fixed to the longitudinal plate 13 and engages a threaded hole 24 present in a flange 25 fixed to the base 31*a* of the angular plate 31*a*, 31*b*.

For the adjustment, the angular plate 31*a*, 31*b* and therewith the cradle 23 housing the printing head 8 are moved along the longitudinal plate 13 by activating the micrometric screw 20.

The fine adjustment means further comprises a second fine adjustment means for adjusting the mutual alignment between the longitudinal axes P of the printing heads 8.

Also in this case, the second adjustment means comprises, for each printing head 8, a micrometric screw 26 counteracted by a spring 40 for eliminating the clearance of the thread of the micrometric screw 26.

The micrometric screw 26 is supported in a housing 38 fixed to the base 31*a* of the angular plate 31*a*, 31*b* and engages a threaded hole 39 present in the base 33 of the cradle 23.

The micrometric screw 26 rotates the cradle 23 about the pin 32 and the rotation of the cradle 23 is counteracted by a spring 41 supported by the shoulder 31*b* of the angular support 31*a*, 31*b* and resting against the cradle 23.

The spring 41 slides on the cradle 23 allowing the latter to rotate but remains under tension so as to block the angle of rotation achieved by the cradle 23 following the activation of the micrometric screw 26.

Each printing station 4 is arranged to dispense ink in a single color. The printing process takes place as follows.

Before starting the printing process, the initial settings related to the format of the containers 5 to be printed are performed.

If the external diameter of the batch of containers 5 to be printed is larger than that of the batch just printed, the printing unit 3 must be moved away from the table 2 to allow the containers 5 to be correctly positioned below the printing heads 8 of each printing station 4, vice versa if the external diameter is smaller.

At this point, the toggle 9 is activated at each printing station 4 to reorient the lying planes S in which the printing heads 8 lie so that the printing can be carried out substantially with the condition of belonging of the axis of the container 5 to the main lying plane S of the printing heads 8.

Before starting the printing process, the printing heads 8 of each printing station 4 are also adjusted by means of the micrometric screws 20, 26 which adjust the section of overlap F between the printing heads 8 and respectively the alignment of their longitudinal axis P in a direction parallel to the axis M of the spindle 6.

In particular, the section of overlap F must be such that it overlaps one or more of the firing nozzles included in the adjacent printing heads 8.

Once the preliminary adjustments have been completed, the table 2 is activated, to whose spindles 6 the containers 5 are supplied by a loader not shown.

The table 2 is activated in step-by-step rotation, and at each advancement step it sequentially positions each first container 5 below the detection station 100 and then below the subsequent printing stations 4.

At each stop of the table 2, the spindles 6 are rotated on their axis M.

During the rotation of the container 5 below the detection station 100, its eccentricity profile is acquired which will be processed by the electronic controller to establish the hourly motion law s=s(t) to be performed by the printing heads 8 when the container 5 will be stopped thereat to maintain their distance from the container 5 constant.

An ink is dispensed at each printing station 4 with a single passage with the printing heads 8 moving according to the hourly motion law s=s(t) in a manner synchronized with the rotation on itself of the container 5.

Each printing station 4 is dedicated to the application of a single ink of a different color from that used in the other printing stations 4.

The ink jet digital printing machine for printing on cylindrical substrates as conceived herein is susceptible to many modifications and variations, all falling within the scope of the inventive concept; furthermore, all the details are replaceable by technically equivalent elements.

In practice, the materials used, as well as the dimensions, can be any according to the needs and the state of the art.

The invention claimed is:

1. An ink jet digital printing machine for printing an image on at least one container with a longitudinal axis, comprising a conveying table conveying said at least one container and at least one printing station provided with at least one printing head, wherein said table has a rotation axis and supports at least one support spindle on which said container is lockable, wherein said at least one spindle has an axis oriented radially with respect to said rotation axis of said conveying table, wherein said conveying table is configured to convey and station said at least one spindle at said at least one printing station wherein said at least one spindle is activated in rotation on its axis, wherein the axis of said at least one spindle stationed at said at least one printing station is parallel to the longitudinal axis of said at least one printing head, the ink jet digital printing station further comprising: a detection station detecting an eccentricity profile of said at least one container locked on said at least one spindle during rotation of said at least one spindle, including a distance sensor and an actuation controller actuating movement of said at least one printing head during the rotation of said at least one spindle, wherein an hourly law that is univocally determined by said detected eccentricity profile maintains the distance of said at least one printing head from said at least one container.

2. The ink jet digital printing machine according to claim 1, further comprising: a servo-assisted motorization providing two-directional linear movement of said at least one printing head in a direction parallel to said rotation axis of said table.

3. The ink jet digital printing machine according to claim 1, wherein said distance sensor comprises one or more contactless distance sensors.

4. The ink jet digital printing machine according to claim 3, wherein said distance sensors are optical sensors.

5. The ink jet digital printing machine according to claim 4, wherein said optical sensors are mounted in a fixed position in said detection station and are oriented with an emission direction orthogonal to the axis of said spindle.

6. The ink jet digital printing machine according to claim 5, wherein at least two optical sensors are provided spaced apart in the direction of the axis of said spindle.

7. The ink jet digital printing machine according to claim 1, further comprising an electronic controller configured to stretch the image to be printed to adapt the image to different tangential speeds at which said container rotates relative to said at least one printing head.

8. The ink jet digital printing machine according to claim 1, wherein said conveying table has a vertical rotation axis.

9. The ink jet digital printing machine according to claim 1, wherein said at least one printing station comprises a group of printing heads having a longitudinal axis parallel to and equidistant from the axis of said spindle.

10. A printing method with an ink jet digital printing machine for printing an image on at least one container with a longitudinal axis, wherein the digital printing machine comprises a conveying table conveying said at least one container and at least one printing station provided with at least one printing head, wherein said table has a rotation axis and supports at least one support spindle on which said container is locked, said method comprising: orienting an axis of said at least one spindle radially with respect to said rotation axis of said conveying table, conveying and stationing said at least one spindle at said at least one printing station with said conveying table, rotating said at least one spindle on its axis, wherein the axis of said at least one spindle stationed at said at least one printing station is parallel to the longitudinal axis of said at least one printing head, detecting, upstream of the printing station, an eccentricity profile of said at least one container, said container being locked on said at least one spindle rotating on itself and wherein, during the rotation of said at least one spindle on itself at said at least one printing station, moving said at least one printing head with an hourly law that is univocally determined by said detected eccentricity profile so as to maintain the distance of said at least one printing head from said at least one container constant.

* * * * *